Figure 1:
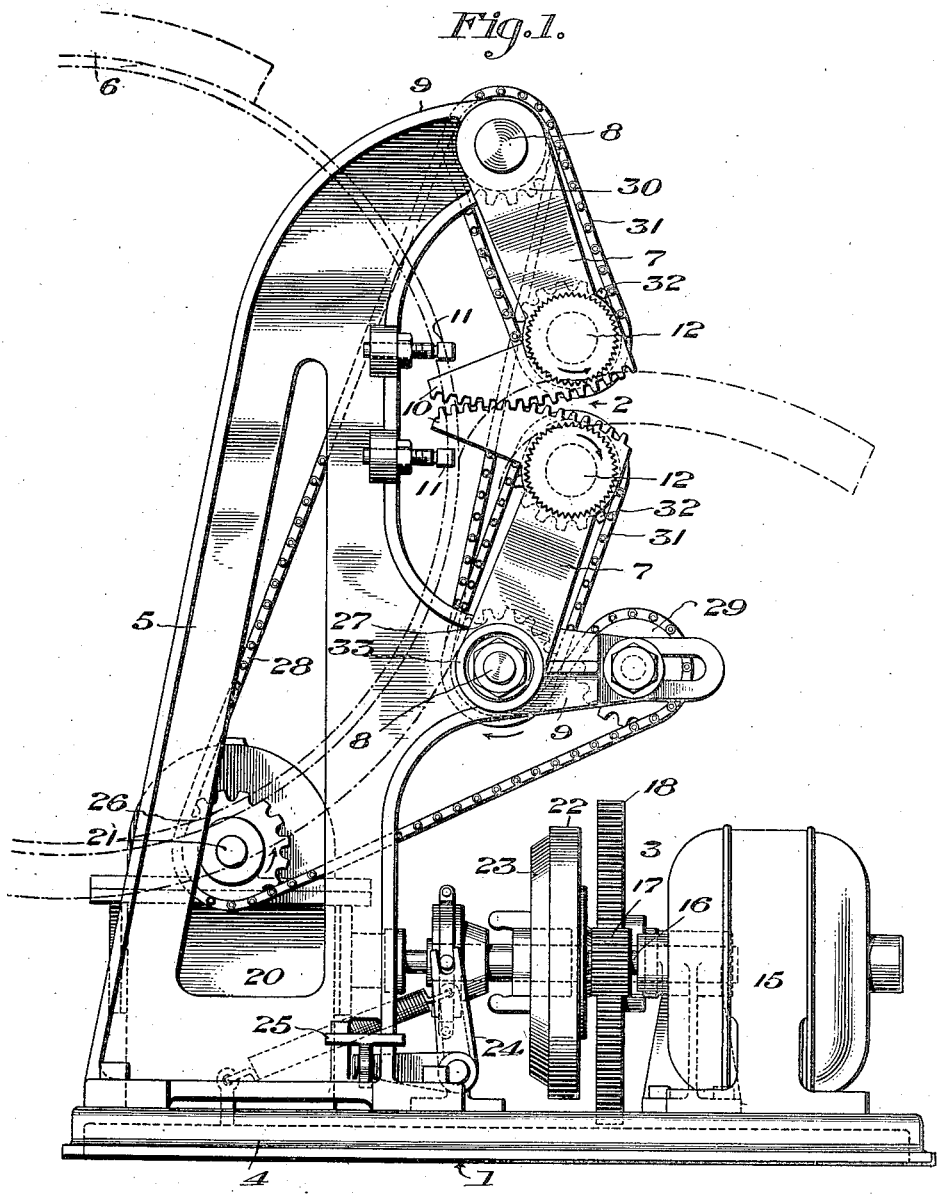

July 24, 1923.

W. C. STEVENS

TIRE STRIPPING APPARATUS

Filed Feb. 13, 1922

1,462,524

2 Sheets-Sheet 1

Inventor
William C. Stevens
By G. P. El.
Attorney

Philip E. Barnes

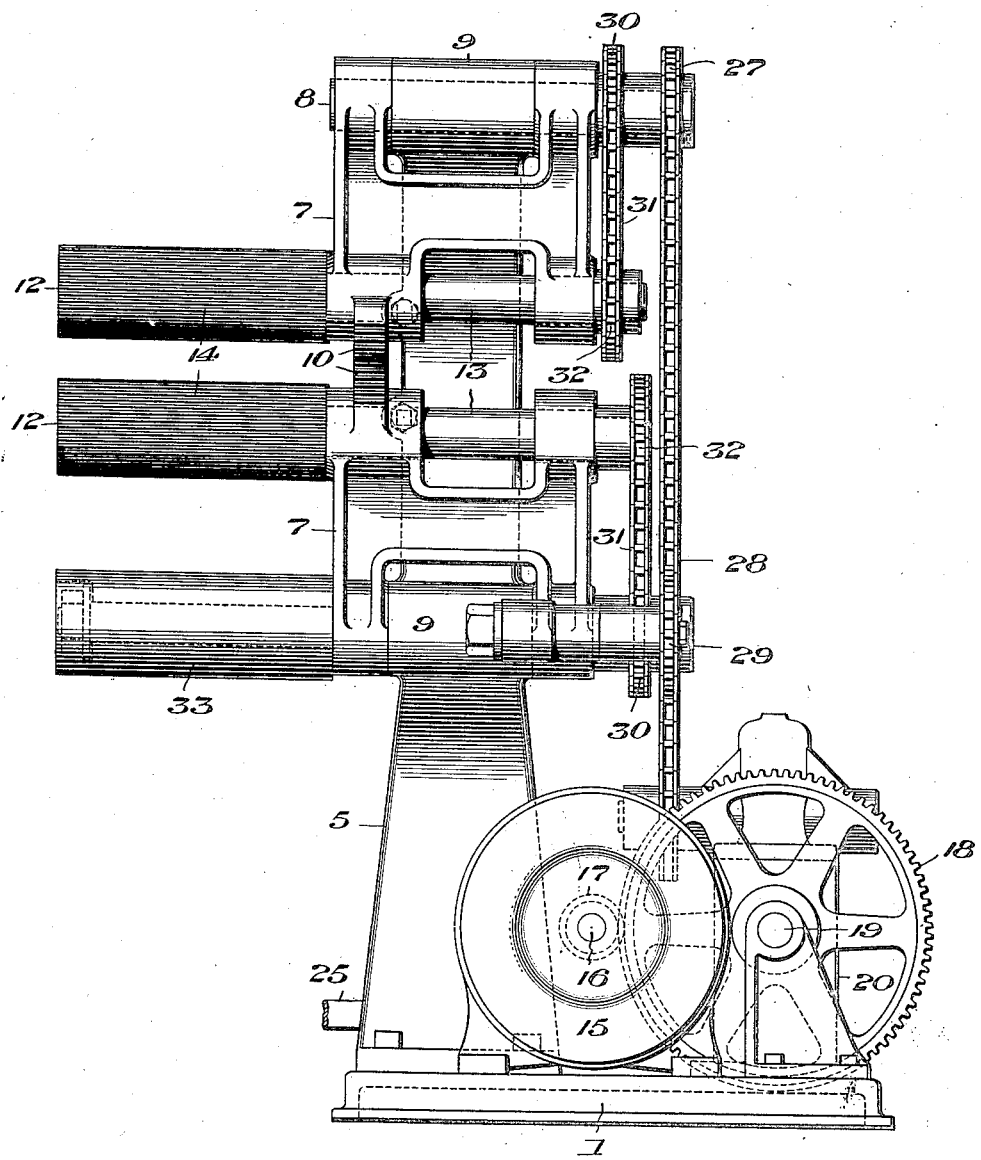

Patented July 24, 1923.

1,462,524

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-STRIPPING APPARATUS.

Application filed February 13, 1922. Serial No. 536,381.

*To all whom it may concern:*

Be it known that I, WILLIAM C. STEVENS, a citizen of the United States, residing at Akron, in the county of Summit and State of Ohio, have invented certain new and useful Improvements in Tire-Stripping Apparatus, of which the following is a specification.

My invention relates, broadly, to tire stripping apparatus, and, more specifically, to improvements in such apparatus for removing solid tires from their metal base or rim.

Tires of the above designated class usually embody, as a component part thereof, a flanged metal base or rim to which the resilient component of the tire is affixed by the process of vulcanization. The union between these component parts is, necessarily, designed to be of a substantially permanent nature. To this end the tire usually includes a stratum, contiguous the metal base, or rim, of a composition particularly adapted to unite with the face of the rim under the action of heat and pressure, and the face of the base is scored circumferentially in order to further facilitate the formation of a substantially indestructible union between it and the above mentioned stratum. The advantages of again utilizing these bases or rims of worn tires will be apparent without further explanation. From the foregoing, however, it will be seen that in reclaiming the bases of such tires, certain difficulties are presented to the operator whereby it becomes impracticable to attempt the operation by hand. Furthermore such difficulties are accentuated by the weight and bulkiness of the tire particularly in the larger sizes of truck tires.

The present invention is particularly directed toward providing an organized mechanism whereby the rubber and the metal components of such tires may be separated in a practical and expeditious manner irrespective of the size of the tire or the condition of the resilient portion thereof.

Furthermore the invention seeks to provide a type of apparatus wherein the weight of the tire may be utilized as a primary factor in accomplishing the separating operation contemplated.

Other objects, and advantages, such as simplicity of construction and a capacity for dependable and consistent operation have also been directly considered as will presently appear, the mechanism and its operation being fully described in the following portion of this specification, and illustrated in the drawings accompanying and forming a part thereof.

In the drawings,

Fig. 1 is a side elevational view illustrating one embodiment of my invention, as it appears in operation, and a portion of a tire in dot and dash lines, positioned relative thereto, and, Fig. 2 is a front elevational view with the parts in the position shown in Fig. 1.

Referring to the drawings, and as best shown by Fig. 1, it will be seen that the mechanism comprises as its essential features a base 1, a tire gripping and rotating unit, designated generally by the numeral 2, and a driving unit 3. The base 1 may be of any suitable construction, but in the present instance it comprises a platform 4, for supporting the driving unit, presently described, and an upright column 5 adapted to support both the gripper and rotating unit 3, and the tire 6. The gripper unit comprises a pair of brackets 7 which are mounted one above the other for swinging movement in a vertical plane. Preferably they are freely mounted upon individual shafts 8 which are journaled in vertical alignment upon rearwardly projecting extensions 9 of the column 5. As best shown in Fig. 1, one of the brackets is pendant, and the other is upstanding so that in their swinging movement their contiguous ends swing respectively in arcs of a circle approaching each other toward a vertical line extending through the shaft 8. At 10 each bracket 7 is provided with a toothed segment which is constantly in mesh one with the other, and thereby serve to insure a simultaneous and uniform movement of the brackets for a purpose presently apparent.

Normally these brackets are designed to gravitate into a vertical position as will be apparent, by virtue of their free mounting upon the shafts 8, and adjustable stops 11 are provided upon the column 5 for limiting such movement in one direction of the tire as will be seen by reference to Fig. 1. At their free ends the brackets 8 are provided with individual co-operating driven rollers 12 which project laterally therefrom and are provided respectively with integral journal portions 13 freely mounted in their respective brackets for rotation about a horizontal axis. These rollers 12 are designed to grip the resilient element of the tire and to pull or strip it from the metal component thereof in a manner presently set forth and preferably they are fluted as at 14 to insure a secure grip thereon during such operation.

The rollers 12 are driven from the driving unit 3 previously referred to. Preferably the driving unit comprises an electric motor 15, the shaft 16 of which, is geared as by the pinion 17 to a gear wheel 18 fast upon a driven shaft 19. The shaft 19 is suitably journaled at one end upon the platform 4 and connects at its opposite end with a speed reducing mechanism 20 of any suitable form, that is provided with a driven shaft 21. The gear wheel 18 carries a driving clutch member 22 which is adapted to be engaged by a driven member 23 freely rotatable upon the shaft 19. A clutch lever 24, and a foot pedal 25 are shown as operative elements for engaging and disengaging the clutch members 22, and 23, but, the clutch and its operating mechanism, as well as other details of the driving unit, may be of any suitable construction and further description thereof is deemed unnecessary herein.

The shaft 21 of the speed reducing mechanism has fixed thereon a sprocket wheel 26, and the shaft 8 of each bracket 7 is provided with a freely rotatable sprocket wheel 27 best shown in Fig. 2. A sprocket chain 28 connects the aforesaid sprocket in such manner that the sprokets 27 are driven in opposite directions the upper shaft 8 being driven in a counter clock-wise while the lower shaft is driven in a clock-wise direction. Any suitable arrangement of the elements such as the adjustable idler 29 may be utilized for taking up slack in the chain 28.

A similar type of driving means is also employed to connect each sprocket wheel 27 to the roller 12 of its associated bracket 7. In this instance each wheel 27 has fixed thereto a companion sprocket wheel 30 which is also freely rotatable about its shaft 8. The sprocket wheel 30 in each instance is connected by a chain 31 to a sprocket wheel 32 that is fixedly connected to the journal portion 13, of each roller 12.

The tire 6 is designed to be suspended from these gripper rollers 12 in such manner that the weight of the tire materially assists the rollers in performing the stripping operation.

In order to accomplish this result the rubber portion of the tire is cut transversely and one end thereof is disconnected, in any suitable manner, from the face of the metal rim to provide a bight portion which may be initially fed between the rollers 12. The tire is next positioned relative to the rollers 12, as shown in Fig. 1, i. e. with its axis in parallelism with the axis of the rollers and with its cut end in juxtaposition to said rollers. The rollers 12 are now in vertical alignment with their respective shafts 8, or their normal position previously described. The operator may now bend the cut portion of the tire back upon itself and guide it against the rollers 12, whereupon, the clutch 23 having been thrown in by means of the pedal 25, the cut end is drawn between the rollers 12 the arms 7 swinging automatically away from the vertical in order that the rollers 12 may separate to accommodate for the thickness of the rubber component of the tire. At this point attention is directed to the fact that the tire is so positioned that the separated face of its bight portion is uppermost. Rotation of the rollers, through their engagement with the bight portion, acts first to lift the tire vertically and in the direction of said rollers, until the peripheral outer face of the rubber component, adjacent the bight portion, engages the lower roller 12, whereby the tire is suspended from said rollers. The separated face of the bight portion being uppermost it will be apparent that the entire weight of the tire pulls the metal rim away from the inner periphery of the rubber component. Coincident with the separating action thus effected between the elements of the tire rotating rollers 12 exert a continuous pull upon the rubber element in a direction laterally of the rim and thereby rotate the tire until the elements thereof have been entirely separated. Conversely the weight of the tire acts to swing the brackets 7 into a vertcal position thus forcing the rollers together and causing them to firmly grip the rubber element such action being accentuated, obviously with the larger sizes of tires.

If desired, an idler roller 33 may be mounted axially of the lower shaft, 8, or in any other suitable position, against which the periphery of the tire fulcrums during the above described operation. This latter construction is preferable with heavier types of tires as it directs the pull of the weight thereof more uniformly against the shafts 8. However, it is not essential to the present invention and in its absence the tire fulcrums against the lower roller 12 as will readily be seen without further explanation.

Although my invention has been described in detail in the foregoing, and certain restrictive terms have been necessarily utilized therein, it is to be understood that the present disclosure is merely illustrative of a preferred embodiment of my invention and 1,462,524 is not designed to impose any limitations thereon, unless otherwise specified in the claims appended hereto.

Claims:

1. Apparatus for stripping the rubber portion of solid tires from their metal bases, comprising, a support, and gripper elements mounted thereon, adapted to suspend the tire through engagement with the rubber portion thereof said elements being operable to exert a pulling action against the rubber portion in a direction away from the face of the rim.

2. Apparatus for stripping the rubber portion of solid tires from their metal bases comprising, a support, and rotatable gripper elements mounted thereon adapted to suspend the tire through engagement with the rubber portion thereof, said elements being operable to exert a pulling action against the rubber portion in a direction away from the face of the rim.

3. Apparatus for stripping the rubber portion of solid tires from their metal bases comprising, a support, and co-operating elements mounted thereon adapted to suspend the tire in a substantially vertical position through engagement with the rubber portion thereof, said elements being operable to exert a pulling action against the rubber portion in a direction away from the face of the rim.

4. Apparatus for stripping the rubber portion of solid tires from their metal bases comprising, a support, and co-operating elements adapted to suspend the tire through engagement with the rubber portion thereof and to effect such engagement through the weight of said tire, the elements being operable to exert a pulling action against the rubber portion in a direction away from the face of the rim.

5. Apparatus for stripping the rubber portion of solid tires from their metal bases comprising, a support, gripper elements mounted thereon adapted to suspend the tire through engagement with the rubber portion thereof said elements being operable to exert a continuous pulling action against the rubber portion in a direction away from the face of the rim, and a member upon the support adapted to bear against the periphery of the tire to act as a fulcrum therefor, said member being arranged to distribute the weight of the tire relative to said grippers.

6. Apparatus for stripping the rubber portion of solid tires from their metal bases comprising, a support, rotatable gripper elements mounted thereon adapted to suspend the tire through engagement with the rubber portion thereof said elements being operable to exert a continuous pulling action against the rubber portion in a direction away from the face of the rim, a member upon the support adapted to bear against the periphery of the tire to act as a fulcrum therefor said member being arranged to distribute the weight of the tire relative to said gripper elements, and clutch operated means for rotating the grippers.

7. Apparatus for stripping the rubber portion of solid tires from their metal bases comprising, a support, rotatable gripper elements mounted thereon for suspending the tire from the support adapted to grip the rubber portion of the tire through the action of the weight thereof said elements being operable to exert a pulling action on the rubber portion of the tire in a direction away from the face of the rim.

8. Apparatus for stripping the rubber portion of solid tires from their metal bases comprising, a support, rotatable gripper elements mounted thereon, for suspending the tire from the support adapted to grip the rubber portion thereof through the action of the weight of the tire said elements being operable to exert a pulling action on the rubber portion of the tire in a direction away from the face of the rim, and a member upon the support adapted to bear against the periphery of the tire to act as a fulcrum therefor said member being arranged to distribute the weight of the tire relative to said gripper elements.

9. Apparatus for stripping the rubber portion of solid tires from their metal bases comprising, a support, rotatable gripper elements mounted to oscillate thereon for suspending the tire therefrom adapted to grip the rubber portion through the action of the weight of the tire said elements being operable to exert a continuous pulling action on said rubber portion in a direction away from the face of the rim thereof.

10. Apparatus for stripping the rubber portion of solid tires from their metal bases comprising, a support, rotatable gripper elements mounted to oscillate thereon for suspending the tire therefrom adapted to grip the rubber portion through the action of the weight of the tire, said elements being operable to exert a continuous pulling action on the rubber portion in a direction away from the face of the rim, and a member mounted upon the support adapted to bear against the periphery of the tire to act as a fulcrum said member being arranged to distribute the weight of the tire relative to the said grippers.

11. Apparatus for stripping the rubber portion of solid tires from their metal rims, comprising, a support, a pair of vertically arranged superposed brackets having their respective ends journaled respectively thereon and their adjacent free ends adapted to oscillate respectively in reverse arcuate paths, toothed segments connecting the adjacent ends of the brackets for simultaneous oscillation, adjustable stops upon the support for limiting the movement of the brackets in one direction, a fluted roller mounted upon the free end of each bracket for rotation about an axis parallel with the journaled axis thereof, a second roller mounted for rotation about the journal axis of the lower bracket, and means for rotating the fluted rollers.

12. In an apparatus for stripping solid tires from rims, a pair of gripping rollers, means to rotate said gripping rollers, so as to pull the tire from the rim, and movable supports for said rollers.

13. In an apparatus for stripping solid tires from rims, a gripping roller for said tire, means to rotate the roller so as to pull the tire from the rim and a movable support for said roller.

14. In an apparatus for stripping solid tires from rims, two gripping rollers mounted above and below said tire, freely movable supports for said rollers operable to cause the tire to be pinched between the rollers.

15. In an apparatus for stripping solid tires from rims, a pair of freely swinging arms, and a pair of gripping rollers on the outer ends of said arms, said rollers being adapted to grip the solid tire.

16. In an apparatus for stripping solid tires from rims, a pair of freely swinging arms, and a pair of gripping rollers on the outer ends of said arms, said rollers being adapted to grip the solid tire and means to coordinate the swinging movement of said arms.

WILLIAM C. STEVENS